United States Patent
Malm et al.

(10) Patent No.: US 11,666,164 B2
(45) Date of Patent: Jun. 6, 2023

(54) SOY PROTEIN STRAW AND MANUFACTURING PROCESS THEREOF

(71) Applicant: Purdue Research Foundation, West Lafayette, IN (US)

(72) Inventors: Morgan J Malm, Kentland, IN (US); Natalie Stephenson, Austin, TX (US); Ruth Zhong, Woodland Hills, CA (US)

(73) Assignee: Purdue Research Foundation, West Lafayette, IN (US)

( * ) Notice: Subject to any disclaimer, the term of this patent is extended or adjusted under 35 U.S.C. 154(b) by 496 days.

(21) Appl. No.: 16/869,841

(22) Filed: May 8, 2020

(65) Prior Publication Data

US 2020/0352373 A1 Nov. 12, 2020

Related U.S. Application Data

(60) Provisional application No. 62/846,089, filed on May 10, 2019.

(51) Int. Cl.

| | | |
|---|---|---|
| *A47G 21/18* | (2006.01) | |
| *A23G 3/44* | (2006.01) | |
| *A23G 3/54* | (2006.01) | |
| *A23P 30/10* | (2016.01) | |
| *A23G 3/36* | (2006.01) | |

(52) U.S. Cl.
CPC ............. *A47G 21/18* (2013.01); *A23G 3/362* (2013.01); *A23G 3/44* (2013.01); *A23G 3/545* (2013.01); *A23P 30/10* (2016.08)

(58) Field of Classification Search
None
See application file for complete search history.

(56) References Cited

U.S. PATENT DOCUMENTS

| | | |
|---|---|---|
| 2004/0013772 A1 | 1/2004 | Weiss |
| 2005/0109857 A1 | 5/2005 | Boone |

FOREIGN PATENT DOCUMENTS

| | | |
|---|---|---|
| WO | 2016168421 | 10/2016 |

OTHER PUBLICATIONS

Kunte, LA et al., "Cast Films from Soy Protein Isolates and Fractions", Biological Systems Engineering: Papers and Publications. 104 (1997).
Gibbens, S, "A brief history of how plastic straws took over the world", National Geographic.com, Jan. 2, 2019.

*Primary Examiner* — Jyoti Chawla
(74) *Attorney, Agent, or Firm* — Purdue Research Foundation

(57) ABSTRACT

The present application relates to environmentally friendly, biodegradable drinking straw manufactured from renewable resources and more specifically to drinking straws manufactured from soy protein isolate and the manufacturing process thereof. The manufacturing process and its products are within the scope of this disclosure.

15 Claims, 2 Drawing Sheets

SOY PROTEIN STRAW AND MANUFACTURING PROCESS THEREOF

CROSS-REFERENCE TO RELATED APPLICATIONS

The present U.S. patent application is related to and claims the priority benefit of U.S. Provisional Patent Application Ser. No. 62/846,089, filed May 10, 2019, the contents of which are hereby incorporated by reference in their entirety into this disclosure.

TECHNICAL FIELD

The present application generally relates to environmentally friendly, biodegradable drinking straws manufactured from renewable resources, and more specifically to drinking straws made of soy proteins and the manufacturing process thereof.

BACKGROUND

This section introduces aspects that may help facilitate a better understanding of the disclosure. Accordingly, these statements are to be read in this light and are not to be understood as admissions about what is or is not prior art.

Plastic straws account for a significant amount of the world's pollution. An estimate of 500 million plastic straws are used every day in the U.S. alone, while as many as 8.3 billion plastic straws pollute beaches around the world. In addition to the massive quantity of waste, plastic straws are not biodegradable. It takes nearly 200 years for them to decompose and by the year 2050, there is projected to be more plastic straws than fish in the ocean (Sarah Gibbens, "A brief history of how plastic straws took over the world," nationalgeographic.com, web accessed 27 Feb. 2019).

It's clear we, as a society, need a change—and that change has already begun. Pending straw ban legislations are in effect in New York City, Hawaii, California, Florida, New Jersey, and Washington, and plastic straw banning movements are being made by groups in various cities in the U.S. including right here in West Lafayette.

There is, therefore, an unmet need for environmentally friendly, biodegradable drinking straw manufactured from renewable resources.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION

Figure 1:
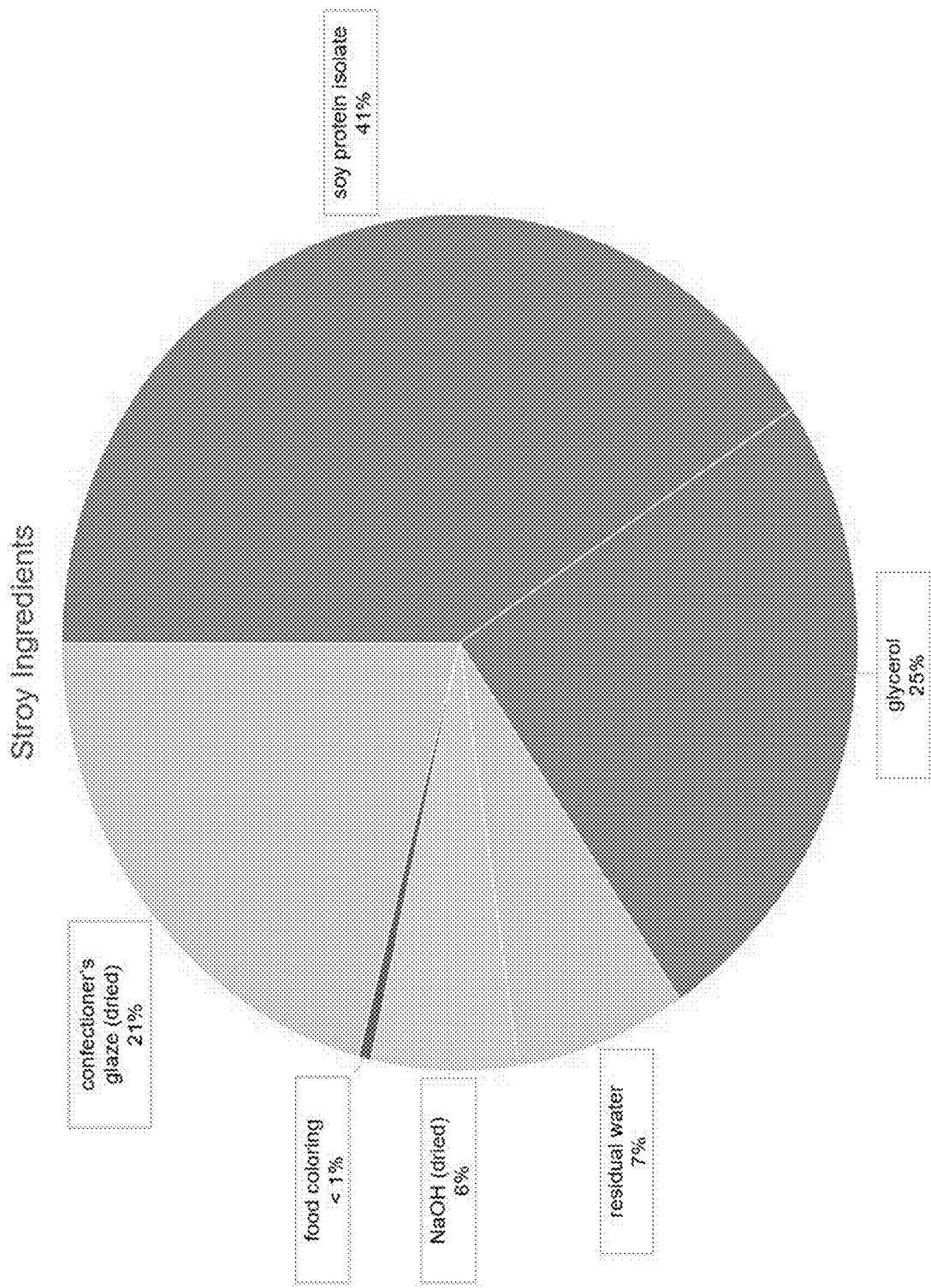
FIG. 1 depicts the composition ingredients used for manufacturing the soy straw disclosed herein.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

As used herein, the following terms and phrases shall have the meanings set forth below. Unless defined otherwise, all technical and scientific terms used herein have the same meaning as commonly understood to one of ordinary skill in the art.

In the present disclosure the term "about" can allow for a degree of variability in a value or range, for example, within 10%, within 5%, or within 1% of a stated value or of a stated limit of a range. In the present disclosure the term "substantially" can allow for a degree of variability in a value or range, for example, within 90%, within 95%, 99%, 99.5%, 99.9%, 99.99%, or at least about 99.999% or more of a stated value or of a stated limit of a range.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting. Further, information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

As used herein, soy proteins, or soy protein isolates, are used exchangeable.

The product of this disclosure, termed "Stroy," or "STROY," is a soy-based drinking straw that is completely biodegradable and offers the material consistency of the commonly used plastic straws. It outperforms and/or competes with the main commercialized alternative, paper straws, in quality, price, and materials, and does not result in deforestation. Other products on the market can't compete on price and are primarily geared towards individual use and not commercialized consumption.

Our vision is to penetrate three separate markets: fast food restaurant chains, fast casual dining, and the coffee and snack shop industry. Within these markets, there will be three commercialized product offerings. We have fully developed a readily commercialized drinking straw for both water and carbonated beverages for fast food restaurant chains and fast casual dining. In addition, we have done extensive research on adding flavor to our process.

In some illustrative embodiments, the present disclosure relates to an environment friendly biodegradable soy protein straw manufactured from soy proteins, glycerol, confectioner's glaze, and sodium hydroxide.

In some illustrative embodiments, the present disclosure relates to environment friendly biodegradable soy protein straws as disclosed herein, wherein said soy protein straw further comprises a food coloring ingredient.

In some illustrative embodiments, the present disclosure relates to environment friendly biodegradable soy protein straws as disclosed herein, wherein said soy protein straws further comprises a flavoring ingredient.

In some illustrative embodiments, the present disclosure relates to environment friendly biodegradable soy protein straws as disclosed herein, wherein said soy proteins account for about 20% to about 60% of the total weight of all materials.

In some illustrative embodiments, the present disclosure relates to environment friendly biodegradable soy protein straws as disclosed herein, wherein said glycerol accounts for about 10% to about 50% of the total weight of all materials.

In some illustrative embodiments, the present disclosure relates to environment friendly biodegradable soy protein straws as disclosed herein, wherein said confectioner's glaze accounts for about 5% to about 50% of the total weight of all materials.

In some illustrative embodiments, the present disclosure relates to an environment friendly biodegradable soy protein straw manufactured according to the process comprising the steps of
 a. preparing soy proteins, glycerol, confectioners glaze, sodium hydroxide and water;
 b. mixing said soy proteins, glycerol and water with magnetic stirring to afford a soy protein solution;
 c. heating said soy protein solution to about 80° C. for about 30 min;
 d. cooling said soy protein solution to about room temperature;
 e. adjusting the pH of cooled soy protein solution to about 10 using a sodium hydroxide solution;
 f. adding optional food coloring ingredient and/or flavoring agent under stirring;
 g. preparing a soy protein film by casting said soy protein solution to a surface, wherein said surface has a coating of polydimethylsiloxane (PDMS) to facilitate removal of said soy protein film;
 h. curing and then peeling said soy protein film from said surface while said soy protein film is flexible;
 i. rolling said soy protein film into a tube and sealing the seam with a solution of soy protein;
 j. cutting said tube into the size of an individual straw and further dehydrating; and
 k. coating said individual straw with confectioner's glaze to afford said environment friendly biodegradable soy protein straw—Stroy.

In some illustrative embodiments, the present disclosure relates to an environment friendly biodegradable soy protein straw manufactured according the process as disclosed herein, wherein said soy proteins accounts for about 20% to about 60% of the total weight of all materials.

In some illustrative embodiments, the present disclosure relates to an environment friendly biodegradable soy protein straw manufactured according the process as disclosed herein, wherein said glycerol accounts for about 10% to about 50% of the total weight of all materials.

In some illustrative embodiments, the present disclosure relates to an environment friendly biodegradable soy protein straw manufactured according the process as disclosed herein, wherein said confectioner's glaze accounts for about 5% to about 50% of the total weight of all materials.

In some illustrative embodiments, the present disclosure relates to a process for manufacturing environment friendly biodegradable soy protein straws comprising the steps of
 a. preparing soy proteins, glycerol, confectioners glaze, sodium hydroxide and water;
 b. mixing said soy proteins, glycerol and water with magnetic stirring to afford a soy protein solution;
 c. heating said soy protein solution to about 80° C. for about 30 min;
 d. cooling said soy protein solution to about room temperature;
 e. adjusting the pH of cooled soy protein solution to about 10 using a sodium hydroxide solution of about 2 N;
 f. adding optional food coloring ingredient and/or flavoring agent under stirring;
 g. preparing a soy protein film by casting said soy protein solution to a surface, wherein said surface has a PDMS coating to facilitate removal of said soy protein film;
 h. curing and then peeling said soy protein film from said surface while said soy protein film is flexible;
 i. rolling said soy protein film into a tube and sealing the seam with a solution of soy protein;
 j. cutting said tube into the size of an individual straw and further dehydrating; and
 k. coating said individual straw with confectioner's glaze to afford said environment friendly biodegradable soy protein straw—Stroy.

In some illustrative embodiments, the present disclosure relates to a process for manufacturing environment friendly biodegradable soy protein straw as disclosed herein, wherein said soy proteins accounts for about 20% to about 60% of the total weight of all materials.

In some illustrative embodiments, the present disclosure relates to a process for manufacturing environment friendly biodegradable soy protein straw as disclosed herein, wherein said glycerol accounts for about 10% to about 50% of the total weight of all materials.

In some illustrative embodiments, the present disclosure relates to a process for manufacturing environment friendly biodegradable soy protein straw as disclosed herein, wherein said confectioner's glaze accounts for about 5% to about 50% of the total weight of all materials.

In some illustrative embodiments, the present disclosure relates to an environmentally friendly soy protein straw manufactured according to the process as disclosed herein Patent Search Process and Relevant Literature We conducted our patent search based on key words on patent websites lens.org, Google Patents, USPTO, and the Purdue Library of Patents. We conducted the analysis based on the following keywords: soy biodegradable straw, biodegradable drinking straw, drinking straw, soy drinking straw, and soy straw. We termed our soy protein based drinking straw product as "STROY" or "Stroy". After searching through thousands of patents and not finding any patent with close relation to Stroy, we concluded that our idea was original. From there, we decided to search for direct competitors based on three key indicators: biodegradability, individual vs. commercialized use, and price competitiveness.

We found two primary direct competitors in Aardvark and a commercialized compostable and biodegradable drinking straw. Aardvark has a large share of the paper straw, biodegradable industry in the U.S. The other commercialized biodegradable straw can be found on greenpaperproducts.com and at $0.05 per straw is price competitive. The other 8-10 patents we found that were the most relevant in biodegradable materials, were either for individual use and not mass consumption, or were not price competitive. We classified these as indirect competitors.

Market Analysis

Comparable Products

As mentioned in the previous section, there are two main products that are comparable to Stroy. Here is a more detailed analysis:

Aardvark

"Aardvark® paper straws are the only paper straws on the market that are made in the USA, use only FDA compliant, food-grade materials, and are marine degradable and compostable." (Aardvark Straws—Made in the USA—Biodegradable—Compostable. www.aardvarkstraws.com/our-story/. Accessed Feb. 27, 2019). Aardvark has a large share of the paper straw, biodegradable industry in the U.S.

Differentiation Opportunities:

Paper straws are known to lose form in water quickly. This has caused a negative public perception on paper straw substitutes. We developed our soy-based straw of Stroy to have the material consistency of a plastic straw and maintain its insolubility.

Benefits, Advantages, and Limitations

As states have recently begun to ban the production of plastic straws, we have a ready to manufacture product that can penetrate a very new, niche biodegradable drinking straw market. Stroy's four main product differentiators are its biodegradability, quality, cost competitiveness, and environmental friendliness. As mentioned in previous sections, there is a large social movement happening in the U.S. and around the world to limit and eventually end the use of plastic straws. With that comes the need for a comparable substitute. Currently, paper straws are the most popular substitute. Many consumers complain that paper straws do not hold their shape and dissolve quickly in their drinks and become "soggy" even before the drink is finished.5 The Stroy prototype holds form for one hour in water and five hours in soda beverages. This is significantly more than paper straws and as we develop and improve our technology we project it to increase even more.

In addition to quality, based on mass production we expect Stroy's cost per straw to be comparable to paper straws. Between $1.5 billion and $2 billion plastic straws are sold each year. Before straw ban legislations, paper straws accounted for less than 1% of that number. Since the plastic straw ban, paper straws are projected to take over 20-50% of the market and as more and more states add the ban to their legislature, the availability for market size increases. The projection also takes into account the fact that plastic straws cost $0.005 to produce, while paper straws cost $0.025. This shows that the demand for drinking straws is of low price sensitivity and consumers and businesses have a higher willingness to pay proving that there is a growing demand for plastic straw substitutes, even if the cost is greater to produce. Because there is only one main distributor of paper straws currently penetrating the market in Hoffmaster (acquired Aardvark Straws in August of 2018), there is room for more players.

Along with quality and price, Stroy is completely biodegradable AND environmentally friendly. Isn't that the same thing? Well, not really. Paper straws are indeed biodegradable, but as production continues to increase, more trees are needed—leading to deforestation. Deforestation increases greenhouse gases entering the atmosphere, therefore causing climate change. In addition, 80% Earth's land animals and plant vegetation live in forests, so the increasing demand for paper can cause drastic negative effects on the planet.

Our soy-based straw of Stroy will save ocean and plant life and also increase the demand for soy, therefore improving the agricultural economy as a whole. Soybean farmers and distributors are looking for new products to increase the demand for soy in order to drive growth within the industry. There are 182.5 billion plastic straws used in the U.S. per year. With our demand analysis, we project the potential market size for our Strory straw to be 10-20% of the plastic straw industry within the first year of mass commercialization in 2020 and will continue to take over the paper straw market share each year. We came to this figure based on the analysis done by Hoffmaster, estimating that 20-50% of the market will belong to paper straws within 2019. With an increase in states banning plastic straws, along with the fact that Stroy is price competitive and of higher quality, 10-20% is a fair and an arguably conservative estimate. The exact cost analysis is outlined in a few sections, but we estimate that 4.47 million bushels of soy will be demanded within the first year of Stroy production.

After extensive research, the only limitations that we foresee are the competition with paper straws and the ability to bring our product to market. Like mentioned above, our product is of much greater quality than paper straws and has the ability to maintain form for longer periods of time.

Target Market

Our target market consists of four separate markets: fast food restaurant chains, fast casual dining, casual dining, and the coffee and snack shop industry. Fast food restaurant chains consist of the large chains such as McDonalds, Wendy's, Taco Bell, Burger King, and more. This market consists of 84.8 million American adults per day coming to 30.95 billion per year. Fast casual dining includes Chipotle, Qdoba, Jimmy John's, etc. This market accounts for 147 million adults per year. Casual dining, such as TGI Friday's, Applebees, and Uno's, accounts for 57 million adults per year. While specific metrics on consumer amounts for the coffee and snack shop industry weren't available, this industry has a projected total revenue of $49 billion in 2019. With all this being said, 182.5 billion plastic straws are used in the U.S. per year proving that these four market segments account for a significant portion of the plastic straw market.

Stroy will offer three distinct product lines: the Stroy which will be used for mass commercialization, the Tasty Stroy which will contain flavor infusions (we have also concluded that there is a potential for edibleness), and the Boba Tea Stroy which will be wider in size and be used to penetrate the large Boba Tea industry.

We've completed the prototype phase of producing a soy-based straw, Stroy. Our next step would be identifying means of manufacturing for mass production as well as conducting marketing studies of sampling Stroy to key market segments. Our "bring to market plan" is to start out with selling into high end restaurant and coffee shops that are environmentally conscious and are willing to pay the premium for soy-based straws as an alternative to paper straws. We expect these costs to decrease as production becomes more mass volume which will enable us to penetrate the rest of the market. As our reputation as a viable alternative to paper increases, we will pursue the market penetration of fast food restaurant chains, fast casual dining, and casual dining.

Cost Analysis

TABLE 1

Cost Analysis of Stroy Manufacturing

| | |
|---|---|
| Material Cost | $0.051 |
| Estimated Labor and Overhead (30% of Material Cost) | $0.0153 |

TABLE 1-continued

Cost Analysis of Stroy Manufacturing

| | |
|---|---|
| Net cost per straw (material cost + labor and overhead) | $0.0663 |
| Additional charge for profit (20% of net cost) | $0.01326 |
| Total cost per straw (Net cost + profit) | $0.07956 |

TABLE 2

Cost Analysis of Stroy Manufacturing - Material Cost Breakdown

| Ingredient | Amount (g) | Supplier | price ($/g) | Amount per straw ($) |
|---|---|---|---|---|
| Soy Protein Isolate | 1600 | ADM | $3.50/lb | $0.01 |
| Glycerol | 993.75 | Kraft Chemical Supply | $0.61/lb | $0.00 |
| Water | 32000 | Municipal | $0.12/lb | $0.00 |
| NaOH Solution | 1239.25 | Spectrum Chemical | $2.72/lb | $0.01 |
| Confectioners Glaze Solution | 3244 | A.F. Suter and Company Ltd | $4.06/lb | $0.03 |
| Food Coloring | 4.75 | McCormicks | $0.056/g | $0.00 |

As previously mentioned, cost analysis is based on penetrating 15% of the plastic straw market within the first year of commercialization, equaling 27.375 billion Stroy demanded.

TABLE 3

Soybean Agricultural Impact of First Year

| | |
|---|---|
| Number of straws per bushel | 6124 |
| Number of bushels | 4,470,000 |
| Number of Stroy per year | 27,350,000,000 |
| Price of one soy bushel | $8.84 |
| Total soybean bushels sold from Stroy production | $39,524,000,000 |

As with all new products, prototypes are expensive and with mass production we would expect the costs to go down significantly. We've added 30% for labor and overhead and 20% for profit margins. With our market penetration of 15%, we would have a profit of $362,992,500 within the first year of mass production.

Summary: Stroy conquers a global environmental issue, contains a stronger quality of material than paper straws, once mass manufactured will be price competitive in the niche biodegradable drinking straw market, and will significantly increase the demand for soy. Stroy will enter the market at a time where drinking straw substitutes are in high demand. We strongly believe that our product has the potential to positively impact society as a whole.

Technical Details

Stroy Technical Product Description and Performance

In one Stroy, there is 1.6 grams of soy protein which makes up 43% overall in the final coated straw (See FIG. 1). The straw performs competitively compared to other biodegradable straws. With the current formulation, it is stable for 60 minutes in cold water, and hot black coffee. We consider this an acceptable usage time frame for a single use straw, and has shortened use times compared to sodas since the water contents are very high and water is a very hydrophilic solvent that is capable of penetrating the straw faster. Additionally the heat from the black coffee also helps to break down the coating faster likely through melting, compared to other beverages. The straw has exceptional performance in cold coffee beverages that have milk and sugar, as well as sugar free sodas, due to the lower water contents and presence of less hydrophilic molecules.

The soy protein isolates are critical to the functionality and performance of the soy straw, in addition to its biodegradable impacts. Since the proteins have known film-forming abilities, it allows for substitutions in applications which currently utilize traditional synthetic polymers that are not biodegradable. Specifically in our soy straw, the soy protein provides the structure to the straw which is a critical parameter of this product. Further, its water solubility allows for film forming solutions to consist of water rather than an alternative organic solvent which is more expensive.

In addition, when compared to other legumes, soybeans have a high protein content which gives soy an advantage in producing more straws per other legume harvest quantities. Also, the soy based straws utilize soy protein isolates which are commercially available already, and thus require little additional processes need for the production of soy materials used.

Processing

Soy protein isolates and subsequent design of their polymer films have been of great interest in the field of research, therefore the beginning design outline of the processing parameters for the soy protein based straws were chosen based on those found in the literature.12 Adjustments were made as the materials, resources, and objectives of this project differ from the authors in literature.

The technical processing of the soy protein straws begins with the creation of a solution comprised of distilled water, soy protein isolate (5% w/v), and glycerol (3% w/v) as a plasticizing agent. After the solution is created, it is stirred with a magnetic stir bar on a hot plate for 15 minutes. The solution is then placed in a hot water bath at 85 C for 30 minutes, mimicking a double broiler system. A 2N NaOH solution is added drop-wise to titrate the solution from a pH of 2.5 to a pH of 10, causing the cloudy white solution with suspended particles to transition to a light yellow, translucent solution. Following titration, liquid food coloring is added to color the solution appropriately.

Figure 2:
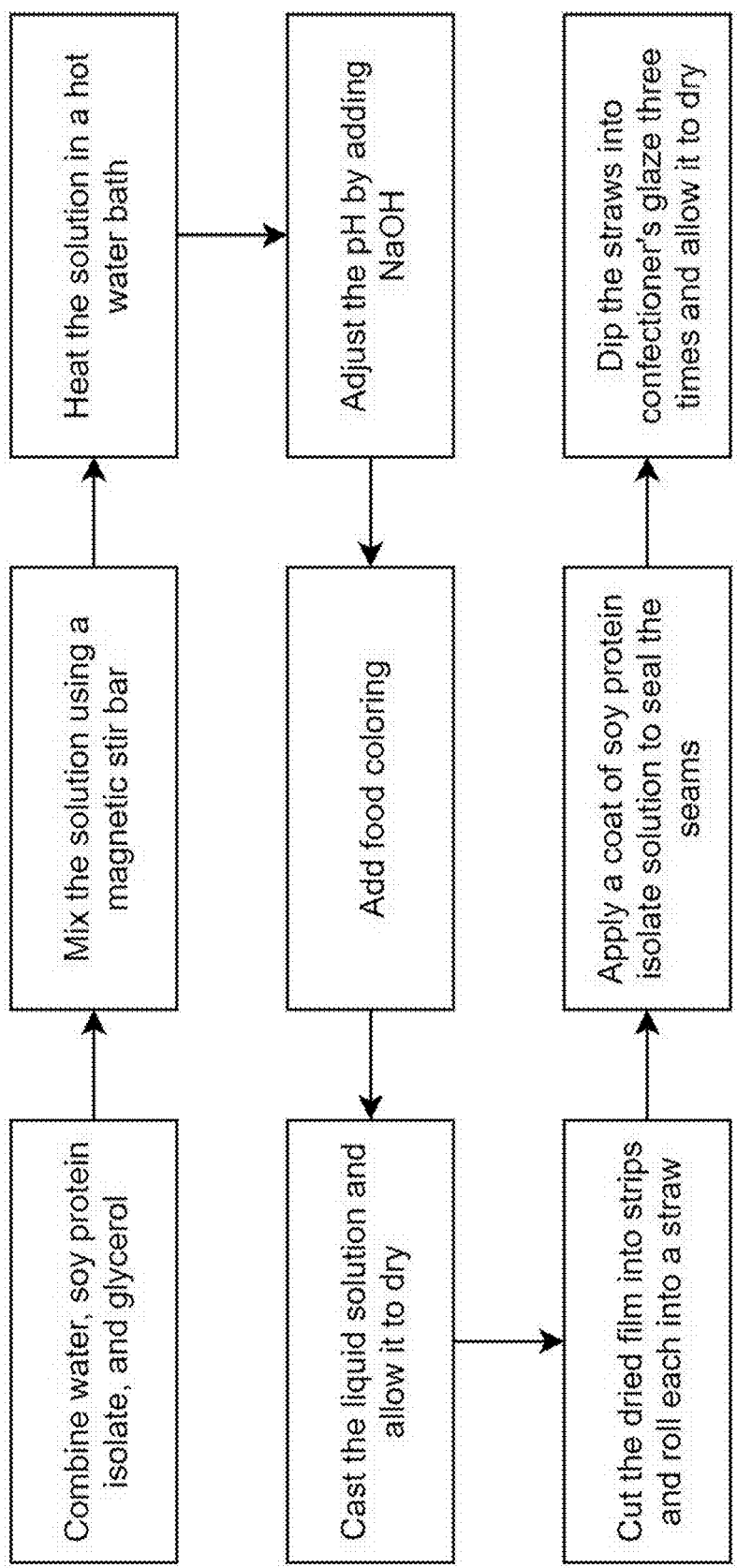
FIG. 2 outlines a general production process for manufacturing the soy straws disclosed herein.

The prepared liquid solution is then cast onto a surface (e.g. lab petri dish). When the films have completely dried (approximately 24 hrs), it can be shaped into straw by manual rolling of the film. Because the soy protein is hydrophilic, as can be understood since water is an excellent solvent, additional small amounts of water is along the straw's seam to act as an adhesive upon drying. The straw is then coated in a concentrated soy protein solution, produced by following the procedure above and evaporating excess water, this adds further structure to the straws while sealing weak points of exposed seams. After, soy protein straws are coated in triplicate with confectioner's glaze, which leaves a shiny hard coating when dried, and packaged in paper wrapping that is crimped shut (See FIG. 2).

Critical Processing Steps and Parameters

The heating of the solution is an important parameter to disperse and suspend the protein into solution, but it also provides a kill step for any microorganisms that may be present. Since this soy straw is edible through the use of food safe materials, this step is crucial for maintaining food safety.

The titration from an acidic solution to basic solution is a critical processing parameter since it improves the solubility of the soy protein isolate in water, and as a result creates a strong and flexible polymer. Through consultation with scientists at ADM we learned that this is a result of titrating causing the hydrolysis of the soy proteins, which allows the protein molecules to become much more soluble in water. Without titration, the proteins are suspended in the solution. As the result, the casted film is brittle and cannot be rolled or shaped into a straw.

The material the solutions are cast on is also an important parameter to consider. We found that it was difficult, although not impossible, to remove the dry soy films from the polystyrene (mid range surface free energy) petridishes. For this reason, when we scaled up to cast onto large glass (high surface free energy) baking dishes already available to us in the laboratory, we first coated the glass with PDMS (low surface free energy) to avoid issues with releasing the soy film from the material it was cast on. Therefore, it should be noted that the soy protein polymers should be cast onto materials with low surface free energy, such has Teflon or PDMS or other fluorine based polymers that typically have non stick properties.

The drying of the soy polymer and straws at the different processing steps are crucial for the formation and functionality of the straw. The water must be evaporated to less than 10% to allow the polymer to be solid, but still malleable enough for the straw production process.

Key Technical Issues for Production

Due to soy protein being water soluble, a coating is required to allow the straw to withstand beverages for an acceptable period of time. Additionally, this material must be biodegradable and edible, therefore only food based materials that are generally regarded as safe (GRAS) for consumption should be utilized to solve such technical issues. Currently, our prototype solves this technical issue by utilizing a water resistant material already being utilized by the food industry: confectioner's glaze. This glaze is a solution of food safe shellac, dissolved in a solvent such as ethanol or acetone since it is not water soluble. From consulting a food scientist, who works for a chocolate company, we learned that it is used widely in chocolate coated products such as chocolate coated peanuts since it provides excellent and shiny coating on such products, and therefore is a material that is food safe and commercially available. We found that three coats of the confectioner's glaze provided ample water protection, compared to other soy and corn materials tested (soy wax and zein).

Production Scale Up and Potential Issues

The prototype production process involves film casting in glass baking dishes, rolling by hand into a straw shape, and then coated by hand individually. To scale up the production of scale straws, these processing steps would have to become mostly automated to achieve efficient, large batch productions of soy straws. Fortunately, scaling up the production of soy straws is relatively easy through the use of equipment and facilities that are readily available.

Currently, paper straws are made through a spiral-winding process (same as paper towel tube) and requires a spiral tube winding machine. 13 Spiral winding processing begins with a solid polymer, which then uses its narrow strands to roll into a cylinder with a desired diameter. In this case, roll to roll manufacturing or extrusion would be required to process the heated solution into a solid polymer film on a large scale. Our team consulted with Purdue University's expert in roll to roll manufacturing of materials, Dr. Chakmak. We learned that to use roll to roll manufacturing, our soy protein solution would need to be concentrated so that it had a honey like viscosity, which could be achieved by evaporating water off through heat. A kinetic air drying study would have to be performed on our concentrated solution to understand the values of different parameters required for roll to roll manufacturing, but would take less than 8 hours to conduct.

After the concentrated soy solutions are processed into soy films by roll to roll manufacturing, polymers films would be cut to specific widths if necessary and rolled around a tube to manufacture a roll for the straw spindling process. Following this process, the rolls of soy protein films would use the spiral winding technology to produce straws with specific dimensions required. Overall straw production is a very large and established industry, thus the manufacturing technology of polymer extrusion and spiral winding is already established. Our product does differ in the beginning materials required for straw production, but the facilities are already in place.

The coating of the straws with soy protein solution and confectioner's glaze would be optimized through nozzle spraying technology already widely used in the food and materials industry. Drying would require a forced air drying system where straws would be continually subjected to flowing air so water and the glaze solvent can evaporate off of the straw. As previously mentioned, confectioner's glaze is very large in the chocolate coating industries so such coating and drying technology are already available.

Finally, straw production regardless of composition or production, share the same paper wrapper packaging techniques and equipment, therefore we foresee no real potential issue for packaging when scaling up the soy straw.

Safety and Social Issues

The soy straw does not have any social issues that we are currently aware of. The safety of this product will be described in regards to its food safety. Stroy was designed using biodegradable materials, including the soy protein isolate, glycerol, and confectioner's glaze, all of which the FDA has determined to be GRAS and is safe for direct consumption following good manufacturing practices. The shelf life of this product will need to be studied, but the ingredient levels and processing parameters were designed to limit bacterial growth. The heating step during processing will kill organisms present and the final soy protein polymer was designed to have a low water activity of about 0.19 compared to the water activity of pure water being 1.0. Microorganisms need free water, which water activity measures, to be available for them to grow. Food scientists accept food materials to be safe of microbial growth if the food material has a water activity of 0.85 or less, therefore we do not anticipate any microbial growth in our product.

Our soy straw, by nature, has soy protein present in its structure. Since soy is a known allergen for some of the population, those with the allergen would not be able to use or consume the soy protein based straw.

Summary of Stroy Accomplishments

Stroy is successful because it is a soy-based straw that is entirely food safe, functional, and price competitive to other readily available straws. In just a few short months, our team was able to develop a product that could hold a straw shape and last in liquid. Before creating prototypes in lab, we did intensive research on soy films/properties, straw alternatives, manufacturing, and coating. This allowed us to build on existing resources and utilize our time in lab developing a new product. Each lab session was spent researching, creating films, or diligently testing a prototype. Every iteration of our soy straw prototype saw improvements in appearance and desirable straw properties. The final soy straw looks, feels, and functions as desired. Our team is passionate about creating an alternative to an urgent social and environmental issue, which has ultimately led to the success of the final product.

The next steps for Stroy are to optimize coating, perform biodegradability tests, and test for longevity in various types of drinks. The waterproof coating is confectioner's glaze, as previously discussed. With more time in the lab and access to better coating technology, our team would test different thicknesses of coatings to optimize weight and effectively reduce costs without losing functionality. Additionally, testing for biodegradability and shelf life would give us a better understanding of how Stroy performs compared to its competitors. To succeed in the straw market, our soy-based straw should decompose faster and last as long as the straws on the current market. At the end of this competition, we were able to test our straw in water, iced coffee, and a few types of soda. The next step would be to continue this testing on more drinks in a larger range of liquid temperatures.

Another aspect we plan to add to Stroy is flavor or taste. All the ingredients used to produce the soy based straw are safe for direct consumption, but currently the straw has a very bland taste. The next steps would be to add liquid or powder flavors, then test for taste and consistency. This addition to Stroy would not take long to develop, since we already have a product that can be eaten, if desired. After adding flavors, we would perform taste tests and food studies to determine which flavors should be further developed into a marketable product. By creating an edible and tasty straw, our market could expand to the direct consumer. Individuals would be able buy Stroy to complement their drink or eat as a snack with both flavor and protein.

Finally, the ingredient glycerol, also known as glycerin, used in our straw is the second ingredient on our label behind soy protein. Glycerol is the backbone of triglycerides, and therefore through chemical reactions can be obtained from oils. One of the next steps for our soy straw would be to find a supplier which derives its glycerol from soybean oil, or other soy products such as byproducts of the soybean biodiesel process, to use as an ingredient in our straw. As all glycerol functions the same regardless of the source it is derived from, we expect no issues with this source substitution. Making this change in supplier would allow us to produce a straw that is 70% derived from soy ingredients.

The following is another illustrative example of manufacturing process for soy straw disclosed herein.

The creation of Stroy starts with a water-based solution. The solution is mixed in a glass bottle with a screw cap. The solution consists of water, soy protein isolate, and glycerol. For 8 straws, we used 250 mL water, 12.8 g SPI, and 7.95 g glycerol. The volume of solution can be increased to make more straws, as long as the ratio of ingredients are kept the same.

After all the ingredients are poured into a glass bottle, it is mixed on a hot plate with a magnetic stir bar for at least 15 minutes (no heat). Immediately after, the bottle is put into a hot water bath at 85 C for 30 minutes (kill step). A 2N NaOH solution is added dropwise to titrate the solution to a pH of 10. For our 8 straw solution, we used 9.915 g of sodium hydroxide solution to obtain the desired pH. The solution bottle is then put back onto the hot plate for slow mixing while food coloring is being added. 1-2 drops of food coloring is added to color the solution.

The prepared liquid solution is cast onto a surface. Our surface was a 17"×11" glass baking dish, with a thin layer of PDMS coating the bottom for easy removal of the film. The films slowly go from a liquid solution to a film in approximately 24 hours. When the films have mostly dried, they are carefully peeled off from the PDMS surface. The large film is cut into 8 strips. We roll each strip around a glass stirrer rod and seal the ends with water by running a damp q-tip along the edge of the strip. Pressure is applied to the edge to ensure a strong seam for the straw. The soy protein films now have their tubular shape and straw structure. The straws are dehydrated in a desiccator with desiccant for one day to remove any residual water prior to coating. Next, the straws are coated three times with confectioner's glaze, with half a day in between coats. The final water activity of the uncoated straw is 0.20 (water activity <0.85 is food safe).

Those skilled in the art will recognize that numerous modifications can be made to the specific implementations described above. The implementations should not be limited to the particular limitations described. Other implementations may be possible. While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected. It is intended that that the scope of the present methods and compositions be defined by the following claims. However, it must be understood that this disclosure may be practiced otherwise than is specifically explained and illustrated without departing from its spirit or scope. It should be understood by those skilled in the art that various alternatives to the embodiments described herein may be employed in practicing the claims without departing from the spirit and scope as defined in the following claims.

BIBLIOGRAPHY

1. Aardvark® Straws—Made in the USA—Biodegradable—Compostable. (2014). Retrieved Feb. 27, 2019, from https://www.aardvarkstraws.com/our-story/.
2. Boone, D. L., Jr. (2005). U.S. Patent No. US20050109857 A1.
3. Compostable Straws. (2019). Retrieved Feb. 27, 2019, from https://www.ecoproductsstore.com/compostable_straws.html.
4. (Compostable Straws) Biodegradable Straws|ECO Friendly. (2019). Retrieved Feb. 27, 2019, from https://greenpaperproducts.com/diposable-biodegradable-straws-st775.aspx. Weiss, S. B. (2002). U.S. Patent No. US20040013772 A1.
5. Loliware (2016). U.S. Patent No. PCT/US2016/027474.
6. Garcia, T. "Meet the company expected to benefit from the war on plastic straws."MarketWatch. 29 Aug. 2018. Web. 27 Feb. 2019. <https://www.marketwatch.com/story/.
7. Gibbens, S. "A brief history of how plastic straws took over the world." Nationalgeographic.com. 2 Jan. 2019. Web. 27 Feb. 2019.
8. Jaaskelainen, L. "Topic: Eating out behavior in the U.S." www.statista.com. n.d. Web. 27 Feb. 2019. <https://www.statista.com/topics/1957/eating-out-behavior-in-the-us/>
9. Jones, D. "Eco-friendly paper straws turn to mush, say Wetherspoons pub-goers." The Sun. 21 May 2018. Web. 27 Feb. 2019. <https://www.thesun.co.uk/news/.
10. Nunez, C. "Deforestation and Its Effect on the Planet." Nationalgeographic.com. 17 Oct. 2018. Web. 27 Feb. 2019.
11. Kunte, L. A.; Gennadios, A.; Cuppett, S. L.; Hanna, M. A.; and Weller, Curtis L., "Cast Films from Soy Protein Isolates and Fractions" (1997). Biological Systems Engineering: Papers and Publications. 104. htttps://digitalcommons.unl.edu/biosysengfacpub/104.

We claim:

1. An environment friendly biodegradable soy protein straw comprising soy protein isolate, glycerol, confectioner's glaze, and sodium hydroxide.

2. The environment friendly biodegradable soy protein straw according to claim 1 further comprising a food coloring ingredient.

3. The environment friendly biodegradable soy protein straw according to claim 1 further comprising a flavoring agent.

4. The environment friendly biodegradable soy protein straw according to claim 1, wherein said soy protein isolate accounts for about 20% to about 60% of the total weight of all component materials.

5. The environment friendly biodegradable soy protein straw according to claim 1, wherein said glycerol accounts for about 10% to about 50% of the total weight of all component materials.

6. The environment friendly biodegradable soy protein straw according to claim 1, wherein said confectioner's glaze accounts for about 5% to about 50% of the total weight of all component materials.

7. An environment friendly biodegradable soy protein straw manufactured according the process comprising the steps of
   a. preparing soy protein isolate, glycerol, confectioners glaze, sodium hydroxide and water;
   b. mixing said soy protein isolate, glycerol and water with magnetic stirring to afford a soy protein solution;
   c. heating said soy protein solution to about 80° C. for about 30 min;
   d. cooling said soy protein solution to about room temperature;
   e. adjusting the pH of cooled soy protein solution to about 10 using a sodium hydroxide solution;
   f. adding optional food coloring ingredient and/or flavoring agent under stirring;
   g. preparing a soy protein film by casting said soy protein solution to a surface, wherein said surface has a coating of polydimethylsiloxane (PDMS) to facilitate removal of said soy protein film;
   h. curing and then peeling said soy protein film from said surface while said soy protein film is flexible;
   i. rolling said soy protein film into a tube and sealing the seam with a solution of soy protein;
   j. cutting said tube into the size of an individual straw and further dehydrating; and
   k. coating said individual straw with confectioner's glaze to afford said environment friendly biodegradable soy protein straw.

8. The environment friendly biodegradable soy protein straw according to claim 7, wherein said soy protein isolate accounts for about 20% to about 60% of the total weight of all materials.

9. The environment friendly biodegradable soy protein straw according to claim 7, wherein said glycerol accounts for about 10% to about 50% of the total weight of all materials.

10. The environment friendly biodegradable soy protein straw according to claim 7, wherein said confectioner's glaze accounts for about 5% to about 50% of the total weight of all materials.

11. A process for manufacturing environment friendly biodegradable soy protein straw comprising the steps of
    a. preparing soy protein isolate, glycerol, confectioners glaze, sodium hydroxide and water;
    b. mixing said soy protein isolate, glycerol and water with magnetic stirring to afford a soy protein solution;
    c. heating said soy protein solution to about 80° C. for about 30 min;
    d. cooling said soy protein solution to about room temperature;
    e. adjusting the pH of cooled soy protein solution to about 10 using a sodium hydroxide solution;
    f. adding optional food coloring ingredient and/or flavoring agent under stirring;
    g. preparing a soy protein film by casting said soy protein solution to a surface, wherein said surface has a coating of polydimethylsiloxane (PDMS) to facilitate removal of said soy protein film;
    h. curing and then peeling said soy protein film from said surface while said soy protein film is flexible;
    i. rolling said soy protein film into a tube and sealing the seam with a solution of soy protein;
    j. cutting said tube into the size of an individual straw and further dehydrating; and
    k. coating said individual straw with confectioner's glaze to afford said environment friendly biodegradable soy protein straw.

12. The process according to claim 11, wherein said soy protein isolate accounts for about 20% to about 60% of the total weight of all materials.

13. The process according to claim 11, wherein said glycerol accounts for about 10% to about 50% of the total weight of all materials.

14. The process according to claim 11, wherein said confectioner's glaze accounts for about 5% to about 50% of the total weight of all materials.

15. A product of the process according to claim 11.

* * * * *